March 13, 1962 W. H. ULMAN 3,024,610
ELECTRICAL CONTROL SYSTEM
Filed April 26, 1956 5 Sheets-Sheet 2

INVENTOR
WAYNE H. ULMAN

BY *Cushman, Darby & Cushman*
ATTORNEYS

March 13, 1962 W. H. ULMAN 3,024,610
ELECTRICAL CONTROL SYSTEM
Filed April 26, 1956 5 Sheets-Sheet 3

INVENTOR
WAYNE H. ULMAN
BY Cushman, Darby & Cushman
ATTORNEYS

March 13, 1962  W. H. ULMAN  3,024,610
ELECTRICAL CONTROL SYSTEM
Filed April 26, 1956  5 Sheets-Sheet 4

FIG. 4A

INVENTOR
WAYNE H. ULMAN

BY Cushman, Darby & Cushman
ATTORNEYS

March 13, 1962 W. H. ULMAN 3,024,610
ELECTRICAL CONTROL SYSTEM
Filed April 26, 1956 5 Sheets-Sheet 5

FIG.4B

INVENTOR
WAYNE H. ULMAN

BY Cushman, Darby & Cushman
ATTORNEYS

United States Patent Office 3,024,610
Patented Mar. 13, 1962

3,024,610
ELECTRICAL CONTROL SYSTEM
Wayne H. Ulman, Clinton Township, Shelby County, Ohio, assignor to The Monarch Machine Tool Co., Sidney, Ohio, a corporation of Ohio
Filed Apr. 26, 1956, Ser. No. 580,837
43 Claims. (Cl. 60—97)

This invention relates to automation of machines, particularly to a control system therefor, and more particularly to control systems for presetting a pattern or program of movements or processes of a machine and executing said pattern or program once or as many times as desired.

Although the invention is particularly adapted to the control of machine tools, and is hereinafter described in relation to a lathe, limitation to such machines is not intended, since the invention is equally operable with many other types of machinery as will be apparent to those skilled in the art.

One phase of the invention particularly relates to presetting the program of movements of the machine. In this respect a number of manually operable push buttons are provided with each representing a particular unit of length. The depressed buttons in a row indicate the desired distance of machine element movement. Several different rows provide for a like number of different distance movements.

Another phase of the invention relates to sensing movement of the machine element to a predetermined distance. This is accomplished by a circuit which compares actual distance of travel with preconditioned elements which represent the predetermined distance. Further, upon sensing of movement to said predetermined position, detection of coincidence between desired and actual distances moved occurs.

A third phase of the invention is the use of a distance sensing converter in conjunction with a program presetter of the type mentioned in phase one above, so that detection of movement to a preset distance may cause actuation of a different group or row of push buttons. To this end there is provided sequence actuating means which may include a sequence register with selection means such as push buttons. Correlation of these push buttons to the different distance rows of push buttons and to the other functions of the machine through means actuated in response to the detection of coincidence, as aforesaid, provides programming of the machine through any number of desired movements.

Accordingly, the primary object of this invention is to provide an improved system of control of movable elements of a machine.

Another object is the provision of apparatus for presetting manually the program which a movable element of a machine is to follow.

Another object is the provision of a register with a plurality of distance selecting members for predetermining the distance movement of an element in a machine.

Another object of the invention is the provision of apparatus to sense the movement of an element in a machine to a predetermined but variable position.

Another object is the provision of a distance presetting register in a machine having a movable element and apparatus to sense movement of the element to a preset distance.

Another object in conjunction with the preceding object is the provision of apparatus for presetting more than one distance on the register and apparatus for moving the element in accordance with the additionally preset distances in a predetermined sequence upon sensing movement to the first preset distance.

Yet another object of the invention is the provision of manually operated selection means to control different functions of a machine during movements of an element thereof sequentially in accordance with a predetermined program.

Other objects, phases, and advantages of the invention will be apparent from the following specification and the exemplary drawings, in which.

Figure 1:
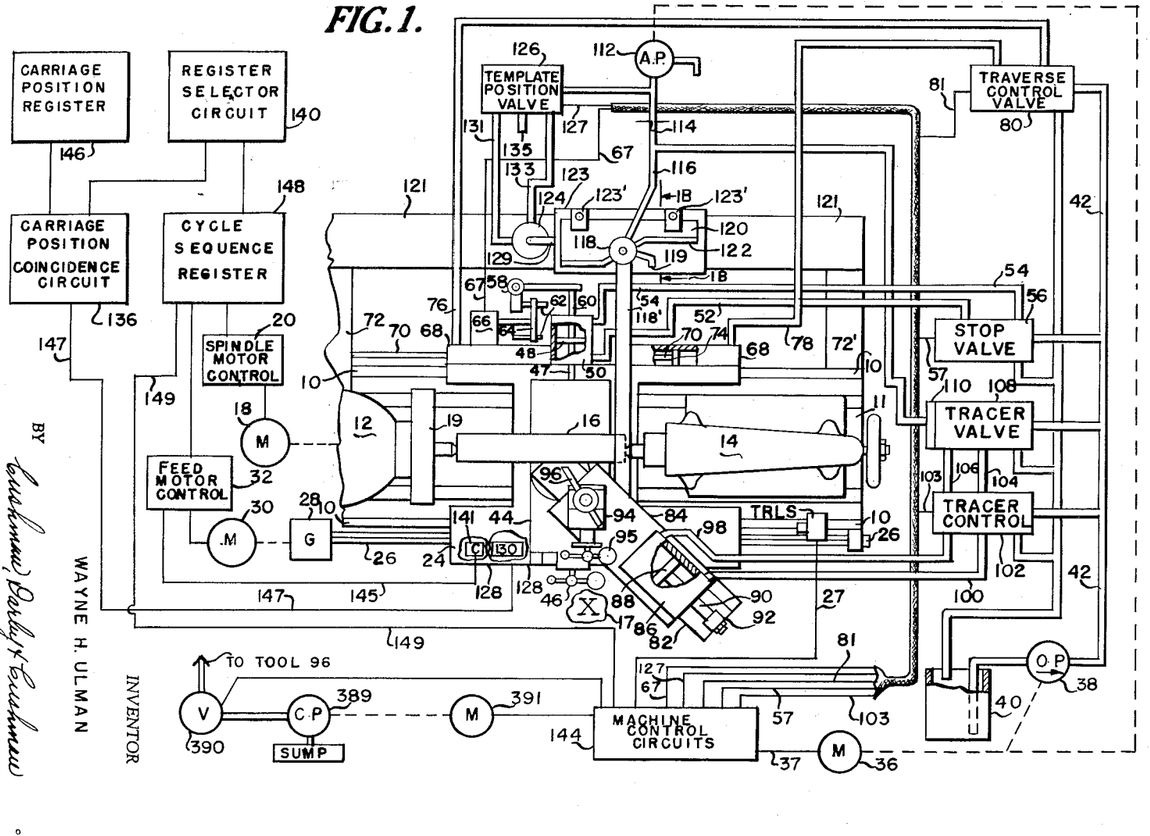
FIGURE 1 is a schematic diagram of a control system in accordance with the present invention as associated with an exemplary lathe in plan view.

Referring now to FIGURE 1, an exemplary machine such as a lathe is shown therein in plan view and has bed ways 10 on bed 11, with a headstock 12 and a tailstock 14 mounted thereon for supporting a workpiece 16 to be machined. Directions of travel herein used such as right, left, rearward and forward are as an operator X standing in the general area 17 would see them while viewing the workpiece 16 in elevation and said directions represent, respectively, movements toward the right, left, top, and bottom of the drawing as viewed in FIGURE 1. The spindle in the headstock, which drives the workpiece by means of a dog or a chuck 19, is driven by a direct current spindle motor 18 energized from a controllable energization source 20 including speed control potentiometers and contacts to control the direction and speed of the spindle motor 18. Carriage 24 is movable along the ways 10 by means of a rotatable feed rod 26 which is driven by reduction gears 28 powered by a feed motor 30. Further explanation of the way in which the carriage is moved by feed rod 26 is hereinafter given with reference to FIGURE 1A. The carriage moves leftward from a predetermined position such as its extreme rightward position where it effectively actuates the traverse right limit switch TRLS when energy is present on line 27 in the manner hereinafter described. The feed motor 30 is energized by means of a controllable feed motor supply 32 including feed speed control potentiometers. Control means 20 and 32 with their speed control potentiometers may be of the type shown in the C. Greene Patent No. 2,609,524, granted September 2, 1952, or in the C. Greene et al. Patent No. 2,864,047.

The equipment superposed on the carriage is controlled by hydraulic and pneumatic means operated from a pump motor 36 electrically energized by current on line 37. This motor drives a hydraulic or oil pump 38 which withdraws fluid from a common hydraulic sump 40 and discharges fluid under pressure into a conduit 42.

A cross slide 44 mounted on the carriage 24 is manually controlled in a forward-rearward direction by means of a standard cross feed screw (not shown) operated by crank 46 which engages a nut (not shown) secured to the cross slide. The rearward end of the feed screw has attached thereto a piston rod 47 and piston 48 mounted in cylinder 50, affixed to the carriage 24 in any suitable manner, for moving the cross slide by power. Hydraulic conduits 52 and 54 are connected to the cylinder 50 at opposite sides of piston 48 to cause motion of the cross slide 44 away from the operator and toward the operator, respectively, when conduits 52 and 54 are appropriately supplied with hydraulic fluid under pressure or connected to exhaust such fluid. Conduits 52 and 54 are connected to a solenoid-operated stop valve 56 which is also connected to the hydraulic supply conduit 42 and to the common hydraulic sump 40. Stop valve 56 may be similar, without limitation intended, to valve 105 in FIGURE 2 in United States Patent No. 2,602,363, and in this application is operated by means of a solenoid (56' in FIGURE 4B) as indicated by electrical line 57 and as hereinafter explained, so that when it is desired not to use the cross slide, the solenoid is de-energized and the stop valve operates to connect conduit 42 to conduit 54 to move cross slide 44 toward the operator. At this time conduit 52 is connected to sump 40. The reverse situation exists when use of the cross slide is desired, that is, stop valve 56 is electrically energized in a manner such that conduit 42 is connected to conduit 52 to move cross slide 44 rearwardly and conduit 54 is connected to sump 40.

The ultimate rearward position of cross slide 44 is controlled by the disposition of one arm of a bell crank 58 pivotally mounted on the carriage 24. The said arm is engaged by the outer end of a piston rod 60 connected to the rear side of piston 48. The other arm of the bell crank 58 engages with one of a plurality of stops 62 mounted on a disc 64 which is rotated by a multi-position, rotary stepping solenoid 66 fixed on the carriage 24. Although only two stops 62 are shown, it is to be understood that as many as needed are used and that the solenoid 66 has a like number of different positions. The rotary solenoid is preferably of the type that during energization thereof by current on line 67, its armature (not shown) pushes up against an electromagnet to index or step the stop carrying disc 64 to a new position. De-energization of the electromagnet of the rotary solenoid permits the armature to move back without moving disc 64 and the next energization will again index disc 64 forward to the next stop position. Of course, other means such as hydraulic or pneumatic motor means could be electrically controlled to adjust or substitute cross slide stops.

Mounted on the rear of carriage 24 is another cylinder 68 which has a piston rod 70 immovably secured at one end to the bed by suitable means, such as bracket arm 72. At its other end, rod 70 carries piston 74 within cylinder 68 whose opposite ends are connected to flexible hydraulic conduits 76 and 78 respectively. These lines are also connected to a carriage return or right traverse, solenoid-operated control valve 80 which is further connected to pressure supply line 42 and sump 40. Control valve 80 may be similar, for example, to the valve shown in FIGURE 1 in United States Patent No. 1,820,653. When reverse or right traverse of the carriage is desired, the traverse control valve 80 is operated electrically by energy on line 81 (which supplies current to solenoid 80'—FIGURE 4B—in a manner hereinafter explained) to permit fluid under pressure to flow from conduit 42 to conduit 78 and into cylinder 68 on the right side of piston 74. Conduit 76 then drains the fluid from the other side of the piston 74 to the common sump 40. When the solenoid for traverse control valve 80 is deenergized, conduits 76 and 78 are connected together and to sump 40 through control valve 80 for free movement of the carriage 24 along the ways 10.

Carried by the cross slide 44 is an angular slide way 82 upon which is mounted an angular slide 84. The angular slide 84 immovably carries a cylinder 86 having a piston 88 therein provided with a piston rod 90 whose outer end is connected to the angular slide way at 92. Upon the angular slide 84 is mounted a tool adjusting slide 94 which carries tool 96, whose adjustment relative to the work is accomplished by the turning of crank 95. Hydraulic conduits 98 and 100 are connected to the cylinder 86 on opposite sides of the piston 88 and to a tracer control valve 102 which may be solenoidally operated (see solenoid 102' in FIGURE 4B) by electrical energization on line 103. Valve 102 may be of the type numbered 138 in FIGURE 3 of the co-pending N. Gusching et al. application, Serial No. 385,540, filed October 12, 1953. When the solenoid for operating valve 102 is deenergized, pressure is supplied from conduit 42 to conduit 100 to cause retraction of angular slide 84 and tool 96. However, when the solenoid for valve 102 is energized, conduits 98 and 100 are connected to conduits 104 and 106, respectively, which further connect to tracer valve 108. This valve also connects to pressure supply conduit 42 and the common sump 40. Tracer valve 108 is controlled by a diaphragm (not shown) mounted within housing 110. On one side of said diaphragm pneumatic pressure is supplied via orifice 114 by an air pump 112 driven by motor 36. Conduit 116 connects the pneumatic pressure to a tracer head 118, carried by a bracket arm 118' affixed to slide 84, which variably discharges the air in conduit 116 to the atmosphere through exhaust opening 119 in accordance with the interengagement of the tracer finger 119' (FIGURE 1B) with the contour of a finishing template 120 or roughing template 122 to vary the air pressure on the diaphragm in housing 110 to control the hydraulic fluid flow through conduits 98 and 100. The particular tracer structure is described in more detail in the C. Johnson patent application Serial No. 625,237, filed October 29, 1945, now Patent No. 2,777,351. This type of tracer structure is also shown in United States Patent No. 2,634,644 with valve 23 and bellows 28 therein corresponding to valve 108 and its diaphragm respectively in this application. Alternatively, a tracer servomotor system of the type described in the N. Gusching et al. patent application Serial No. 385,540, filed October 12, 1953, now abandoned, may be used.

The tracer head 118 is supported by a bracket 118' attached to angular slide 84 and moves the slide when it cooperates with a template 122 or 120, which cooperation is determined in accordance with the position of the template table 123 upon which the templates are held by clamps 123'. The table is pivotally mounted on template rail 121 which is secured to the bed by bracket arms 72 and 72'. As may be seen in FIGURE 1B, table 123 is pivoted at its rear side and is operated by cylinder 124. The cylinder is schematically shown with respect to the table, and its piston 125 through piston rod 129 actually moves the table 123 up and down to permit one or the other of the superposed templates 120, 122 to be engaged by tracer finger 119'. The piston in cylinder 124 is operated by air in pneumatic conduits 131 and 133, which air is controlled by a reversing, template positioning solenoid valve 126 connected to the air pump 112. Valve 126 discharges air through exhaust 135 and is electrically operated by energization on line 127 (which supplies current to the finish cut solenoid 126' of FIGURE 4B) to cause the piston 125 to move from one terminal position of the cylinder to the other for raising and lowering the templates 120, 122 with respect to tracer 118. While the present template table is shown to be operated by pneumatics, it is clear that it could just as well be operated from any other constant pressure source system, such as the illustrated hydraulic system. The structure of the particular template table is shown in the C. Greene et al. Patent No. 2,781,684. Of course, more than two templates may be used in conjunction with a positioning valve which will place the piston 125 at other positions than at either end of its cylinder 124.

Figure 1A:
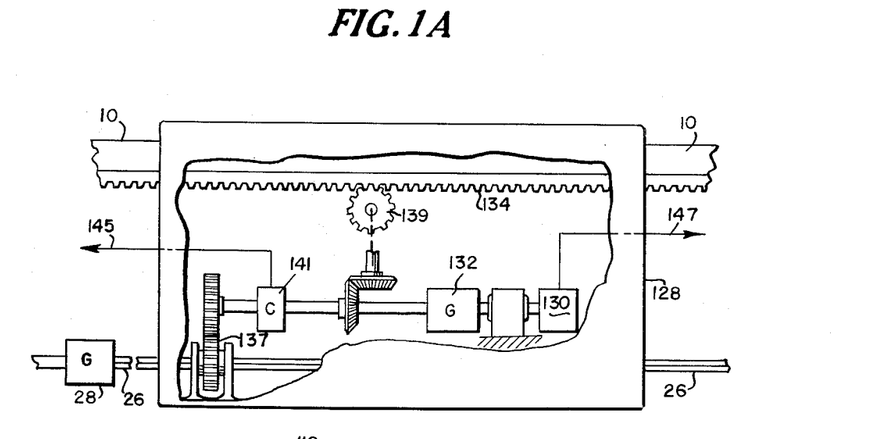
FIGURE 1A is an enlarged fragmentary schematic view of a portion of the carriage drive shown in FIGURE 1.
Figure 1B:
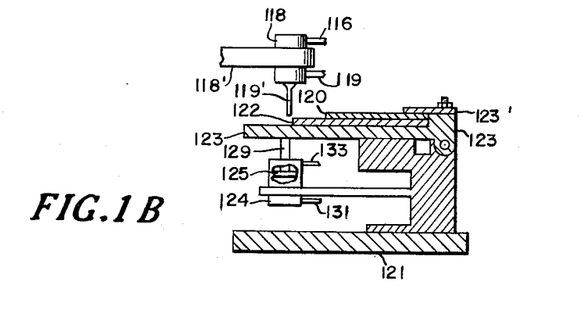
FIGURE 1B is an enlarged fragmentary sectional view taken substantially on line 1B—1B of FIGURE 1.

FIGURE 1A shows the front apron 128 of the carriage 24. Movement of the carriage and apron 128 leftward is accompilshed by rotation of the feed rod 26 through the reduction gears 28 by motor 30 (FIGURE 1). A gear 137 carried by apron 128 is splined to the feed rod 26 for axial movement therealong and rotation thereby to cause rotation of the pinion 139 through a suitable power train having an electromagnetic clutch 141 interposed therein. Pinion 139 engages rack 134 which is immovably secured in any desirable manner to the front way 10 of the bed. Consequently, on rotation of the rod 26, the pinion 139 also rotates and moves carriage 24 to the left. When the carriage is to be returned to the right by the cylinder 68 operated by the traverse control valve 80 as previously explained, electrical energy is provided over line 145 from the feed motor control 32 (in a manner hereinafter explained) to disengage the clutch 141.

Also carried by the apron is an analogue to digital converter 130 which is connected by suitable gearing 132 to rack 134. Position signals from the analogue to digital converter 130 (described hereinafter with reference to FIGURE 4A) are electrically transmitted over line 147 to a carriage position coincidence circuit 136 (FIGURE 1). The instantaneous position of the carriage is sensed by the converter, and its preset ending distance movement is detected since coincidence circuit 136 (electrically illustrated at left center in FIGURE 4A) compares the signal from converter 130 with the signal caused by carriage position register 146 which is mechanically shown in FIGURES 2 and 3. Coincidence causes actuation, as is described in more detail hereinafter, of the register selector circuit 140, which is illustrated at right center in FIGURE 4A and is associated with the cycle sequence register 148 shown in FIGURES 2, 3 and electrically in FIGURES 4A and 4B. The machine control circuits 144 are associated with the register 148 via lines 149 and control the various machine functions as described above and in the hereinafter description of operation.

Figure 2:
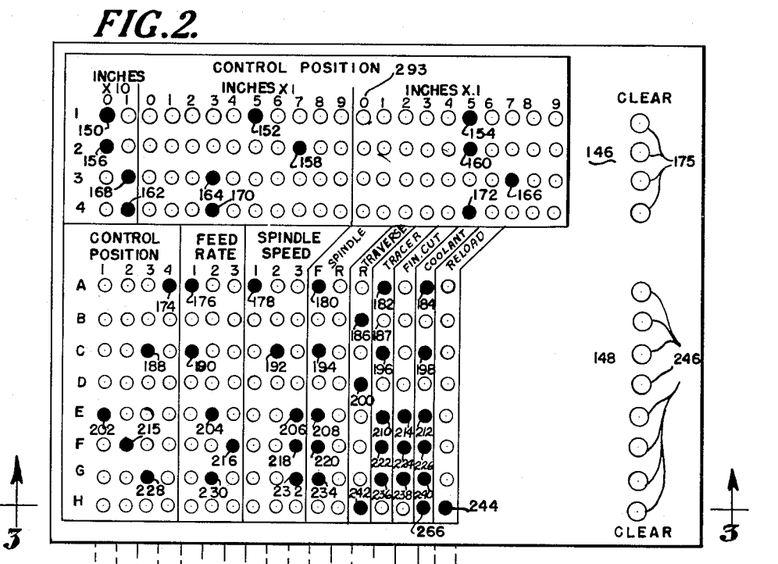
FIGURE 2 is a front elevation of the control panel for such a machine.

Referring now to FIGURE 2, a front elevation of a control panel preferably located in a separate housing is shown. This control panel comprises an upper or carriage position register 146 and a lower or cycle sequence register 148. In the upper register are four rows, numbered 1 through 4, of control members or selection means, such as push buttons, arranged in twelve columns. Each button in a row corresponds to the distance shown at the top of its column with the ten columns on the right being respectively representative of different tenths of inches, the next ten columns to the left being respectively representative of different full units of inches, and the remaining two columns being representative of zero, and 10 inches respectively. Each push button may be manually moved from a first position to a second position, i.e., depressed, and the different rows of buttons may be depressed in any desired pattern to indicate four different distances which it is desired for the carriage 24 to travel. By way of example, without limitation thereto, push button 150 in row 1 may be depressed along with buttons 152 and 154. In accordance with the indicia noted above each column of buttons, the depressed buttons in row 1 indicate a dimension of 5.5 inches, while in row 2 the depression of buttons 156, 158, and 160 indicates a dimension of 7.5 inches. Likewise, the depression of buttons 168, 164, and 166 in row 3 indicates a dimension of 13.7 inches, and in row 4 the depression of buttons 162, 170, and 172 indicates a dimension of 13.5 inches. All the push buttons in both the upper and lower registers which are depressed for purposes of examples are shown in black while those remaining in a "cleared" position are shown in white. It will be understood, of course, that any other combination of depressed buttons may be used. To the right of the distance register 146 are four buttons 175, which are arranged respectively to clear the depressed buttons of rows 1 through 4 of the control position buttons as is hereinafter described.

Figure 5:
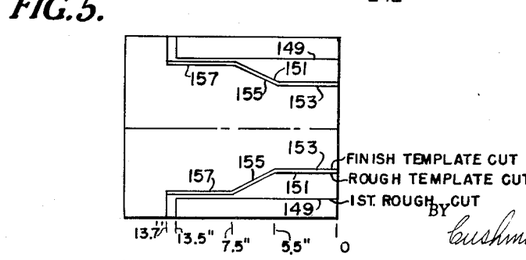
FIGURE 5 is an illustration of a workpiece as would be cut by the specific example described in the specification.

The lower register 148 in the control panel is structurally the same as distance register 146 but provides for the functions which are desired to occur and terminate at the indicated control position. Thus in the specific example shown in FIGURE 5, it is desired that a rough cut, i.e., one without use of a template, be taken along line 149 and terminate at 13.5 inches. In keeping with this example, this terminal dimension has, as above described, been preset in row 4 of upper register 146, so in row A of the lower register 148, the column 4 button 174 is depressed to indicate that row 4 of the control position register 146 contains the terminal dimension for the first cut. For this cut one of three feed rates is selected by depression of button 176 as is one of three spindle speeds by button 178. The spindle is made to run forward by depressing F button 180 with button R being for reverse spindle. The tracer and coolant are placed in operation by depressing buttons 182 and 184. During the leftward feed of the carriage 24 (FIGURE 1) it should be borne in mind that the rearward movement of cross slide 44 is limited by one of stops 62 which in effect control the depth of the cut when no template is involved. When the rough cut is completed and the carriage reaches the terminal distance of 13.5 inches as preset in control position 4, row B of register 148 is actuated so that the carriage is moved rightwardly since traverse right button 186 is depressed in row B. In row C button 188 is depressed so that the tool may make a cut in accordance with the terminal dimension preset in row 3 of register 146 and related to control position 3 of the lower register 148. The rough template 122 is also caused to be active during this cut by rotating disc 64 (FIGURE 1) to its second stop position for rearward movement of cross slide 44 and angular slide 84 while template table 123 is maintained raised by not depressing the finish cut button in row C and the tracer 118 is activated by depression of button 196 to permit rough template 122 to be in contact with tracer finger 119′. This second cut is taken at the same column 1 feed rate as in row A by depressing button 190, but the spindle speed is raised by depressing column 2 spindle speed button 192 to select a different preset spindle speed since the workpiece is now somewhat smaller in diameter. The spindle runs forward, the tracer is on, and the coolant is on by depression of buttons 194, 196, and 198. After the rough template cut along line 151 of FIGURE 5 to the terminal distance of 13.7 inches as set up in control position 3, row D is activated so that the depressed button 200 causes a right traverse which when completed actuates row E. In row E button 202 is depressed to preset the terminal distance of the next cut to control position 1 which in the upper register 146 has been preset at 5.5 inches to allow carriage travel in its regular path that far for a cut along line 153 of FIGURE 5, and as previously, the inward movement of the cross slide is regulated by a different stop 62 on rotated disc 64. (See FIGURE 1). With reference again to row E of FIGURE 2, it will be noted that for this cut a slower feed rate is selected by depression of button 204. However, the spindle speed is selected to be even higher than previously by depression of button 206, and again, the spindle is run forward, the tracer is on, and the coolant is on by depression of buttons 208, 210, and 212. In addition, the finish cut button 214 is depressed to cause template table 123 to change position by dropping down and permit the finish template 120 to be engaged by tracer 118 for guidance of the angular slide 84 and tool 96 during the finish cut.

After the terminal distance of 5.5 inches is reached by the carriage, row E is de-actuated and row F comes into play. Instead of a transverse right for the carriage, it is desired, in keeping with the example of FIGURE 5, to move the carriage ahead another 2 inches to a total of 7.5 inches to cut the taper 155 with the aid of the finish template. Since row 2 of the upper register 146 has been preset to 7.5 inches, control position 2 button 215 is depressed in row F. In view of the fact that the workpiece is tapered and an extremely good finish is desired on this taper, it is desired that the feed rate be reduced during the cut of the taper. Thus in row F a very slow feed rate is caused by the depression of button 216. The other conditions are maintained the same as in row E by depression of buttons 218, 220, 222, 224, and 226. After reaching the 7.5 inches set by control position 2, row G is actuated and therein control position 3 is activated by depression of button 228, so that the cut is continued along line 157 of FIGURE 5. During this cut a higher feed rate can be used, so the former feed rate 2 is re-established by depression of button 230. The remaining conditions are maintained the same as for rows E and F by depressing buttons 232, 234, 236, 238, and 240. At the terminal position of 13.7 inches after the finish cut caused by row G, the carriage is traversed right by actuation of row H and the depression of button 242. The system is prepared for a new workpiece on which the same sequence of operations may be made by depression of reload button 244. However, clear button 246 is associated with each row of buttons A through H so that an individual line or the whole board may have its buttons raised for a new setup.

Figure 3:
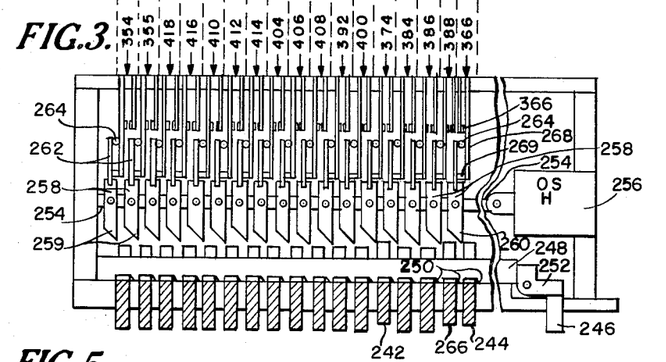
FIGURE 3 is a section through the control panel of FIGURE 2 taken on the section line 3—3 of FIGURE 2.

All the push buttons mentioned heretofore, plus the others shown also as circles in FIGURE 2, mechanically cooperate with the electrical system in the manner shown in the section of FIGURE 3. The buttons are arranged in a front panel 128 and are bifurcated at their inner ends in order to carry a clearing bar 248. The clearing bar is provided with a plurality of sloped-edge, ratchet-like teeth 250 arranged respectively adjacent a push button so that upon moving the clearing bar to the left in the figure the depressed buttons, of which 242, 244, and 266 are examples, are moved out of the depressed position. The clearing bar is held in the right position by a spring (not shown) and is moved leftwardly by a bell crank 252 which is actuated by clearing button 246. Behind each row of buttons there is a switch operating bar 254 normally in its leftward position and which may be moved rightwardly by means of a solenoid 256, also designated operation selector solenoid OS-H, the "H" referring to the row in which the solenoid operates. Pivotally carried on the bar 254 are a plurality of levers 258 which are located so that movement of their front ends 260 may be obstructed by a depressed button. The left front side 259 of each lever is cut back so as not to interfere with a depressed push button. The back ends of the levers 258 are bifurcated for reception of, and operative connection with, vanes 262 which extend from the top to the bottom of the register and are fastened to pivoting shafts 264. It is thus apparent that the energization of solenoid OS-H moves bar 254 to the right so that any lever 258 whose associated push button is not depressed rotates counterclockwise without moving its associated vane 262, but in the case of depressed buttons 242, 244, and 266, for example, the tip 260 of the respectively associated levers 258 is obstructed so that the obstructed levers rotate clockwise with respect to the bar 254. Thus, rotation of corresponding vanes 262 in a counterclockwise direction with respect to their pivots 264 is accomplished. Adjacent each vane 262 is a switch having an extending arm 268 connected preferably insulatively by connector 269 to the associated vane. Therefore, the rotation of the vanes causes operation of respective switches, and in the instant example, switches 374, 366, and 388 are operated. In the upper register 146 and in the lower register 148 all switches are normally open except for the normally closed switch 366 associated with the reload column in the lower register. It is thus seen that there is only one vane and one switch for each column of push buttons in each register, but that there is a solenoid for each row of push buttons in each register so that the closing of a switch is dependent not only upon the depression of a button in the corresponding column but also upon the energization of the solenoid associated with the row in which the depressed button is located.

In the upper register 146 there is an identical arrangement of vanes, switches, levers, and solenoids with one solenoid for each row, and one vane and one normally open switch for each column. The significance of the actuation of the switches in both registers will become apparent with reference to FIGURES 4A and 4B.

Figure 4A:
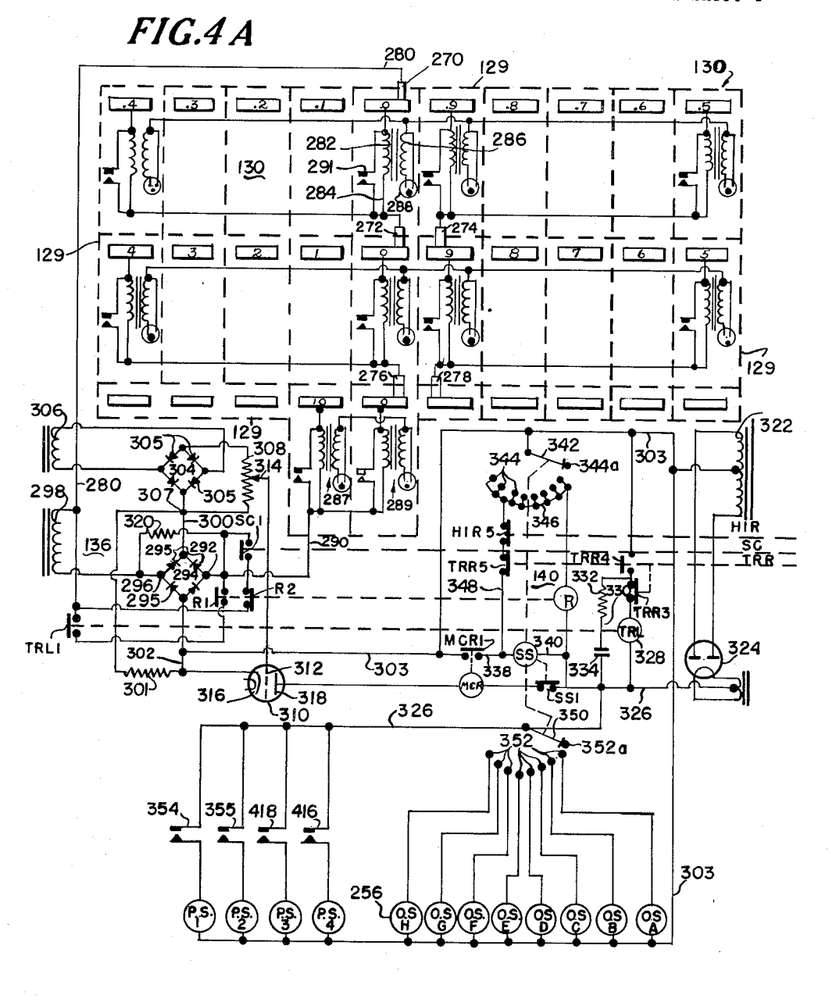
FIGURES 4A and 4B, taken together, show exemplary electrical connections for the instant control system.

These figures illustrate the electrical circuit involved and at the top of FIGURE 4A and within the outside dotted line 129 is the circuit of converter 130. Brushes 270, 272, 274, 276, and 278 are geared together at predetermined ratios and are arranged to move across segments of commutators, when carriage 24 moves, in accordance with the gearing 132 and rack 134 (FIGURE 1). The ten segments of the commutator upon which brush 270 moves are indicated in FIGURE 4A by the numerals 0 and .1 through .9, for example, and in keeping with the specific example heretofore set forth for the right ten push buttons in each row of the upper register 146. Brush 270 is geared to move from one commutator strip to another when the carriage 24 moves one-tenth of an inch along the bed 10. The commutator segments upon which brushes 272 and 274 are in engagement is indicated by the members 0 and 1 through 9 because these brushes are geared to move from one commutator bar to another for each inch of carriage motion. Similarly brushes 276 and 278 are geared to move over their 0 and 10 commutator segments plus those unnumbered remaining segments in the row, if desired, at a rate of one segment per 10 of those associated with brushes 272, 274.

From the preceding, it is evident that the different groups or decades of commutator segments, i.e., the tenths group, the units group, and the tens group are arranged with their respective brushes so that the brushes move along the different groups at a speed ratio of 100:10:1, respectively. First of all, it should be noted that the drawing in FIGURE 4A shows the different rows or groups of commutator segments as a planar view of, preferably, a circular surface. In reality each group of segments may be arranged to form a circular path for its respective brushes, with the illustrated end segments of each group being spaced from each other a distance similar to the spacings between other segments in the group. Therefore, as either brush 272 or 274 moves one inch, i.e., from corresponding points on any two adjacent commutator segments, brush 270 will move across all ten of the tenths segments and back to its starting point. While brush 270 is engaging any of its segments 0, .1, .2, .3, or .4, brush 272 in the first instance engages the units 0 commutator segment. However, when the tenths brush 270 moves to engage any of segments .5 to .9, brush 274 is touching the units 0 segment. The reason for two brushes on the units (and tens) segments is to prevent overlapping by a single brush of two adjacent segments and to assure brush contact to at least one segment at all times. To these ends, brush 274 may be geared or cammed to follow brush 272, not necessarily at a non-varying distance, but so that during the change of brush 270 from the .9 to 0 segments, at which time brush 270 might bridge these segments, brushes 272 and 274 are on different commutator segments of the units row, and since the 0 to .4 segments are connected to brush 272 through circuitry (described below) different from that connecting the .5 to .9 segments to brush 274, ambiguities and inaccuracies of distances are obviated. For like reasons and in like manner two brushes 276, 278 are utilized for the tens row of segments.

Illustrative of the electrical connections of the converter 130, line 280 is connected to brush 270. Current on this line therefore enters the different tenths commutator bars as the brush engages them. Connected to each of the tenth, unit, and tens commutator segments is a similar, shortable impedance element with associated circuitry. Therefore, only that connected to the 0 tenths commutator will be described in detail, with it being understood that the components and wiring in the remaining rectangular, dotted line boxes (except those in the tens row associated with unnumbered segments) is similar even though not shown in part. The impedance element may be a transformer primary 282, but limitation to such an impedance element is not intended since a resistor, for example, would basically serve as well. The primary of each of the transformers associated with the tenths segment is connected at one end respectively to the tenths segments, while the other primary ends of those transformers associated with the 0 to .4 segments are connected in parallel to brush 272 as by line 284 for example. The opposite sides of the primaries of the transformers for segments .5 to .9 are connected to brush 274.

The secondary winding 286 is representative of the secondaries of all the other transformers in the converter 130 and is connected to illuminate a lamp 288, filled with neon or other gas, when the transformer primary is momentarily energized by the current passing therethrough from brush 270 so that the instantaneous position of the carriage in inches may be noted. Lamps 288 may be fed alternating current from transformer secondary 298 through resistance 320, the voltage drop across which is the signal fed into rectifier bridge 294. As explained hereinafter, the voltage across bridge 294 is comparatively high at coincidence. Thus the lamps (like lamp 288) which are associated with the brush contacted segments are lighted unless the associated shorting switches (like switch 291) are closed across primaries 282.

Alternatively, the lamps 288 may be direct current operated. Since these lamps will extinguish as soon as the initial influx of direct current levels off so that current is no longer induced in the secondary winding by changing flux in the primary, the lamps may be connected directly, in parallel or otherwise, to another source of energy (not shown). The voltage of this source should be insufficient of itself to light any of the lamps but sufficient to maintain the luminescence once started by the additional voltage induced into the secondary winding to which the lamp is connected. In addition, the voltage should be low enough so that the voltage induced in the opposite direction in the secondary by the movement of a brush off of the associated commutator segment will reduce the overall voltage momentarily to or below the lamp extinguishing voltage. A lamp system of this sort would be particularly useful in connection with the units and tens groups of segments so that continuous flashing of the lamps is not present. Neon lamps having a substantial voltage range between their breakdown or lighting voltage and their extinguishing voltage as well known in the art. If a resistor is used instead of a transformer and a lamp is connected across the resistor or a part of it, the lamp need not be gaseous. These lamps may be located on the front panel or in the control panel housing, and, for example, may be disposed above the push buttons, or if the buttons are of translucent material with, preferably, their distance designations inscribed on their outer ends, the lights may be placed behind or inside the push buttons to make them glow.

A normally open switch 291 is connected across the primary 282 to reduce the impedance of the primary by shorting it when switch 291 is closed. Switch 291 is the switch associated with the push buttons in the 0 tenths column 293 (FIGURE 2) of the upper register 146. Recalling that each column of buttons in the upper register has a different associated switch, it is readily apparent that the switches for shorting the transformer primaries connected to the other tenths, units, and tens commutator segments are the switches associated with the respective column of push buttons in register 146. As will be apparent hereinafter, the impedance of the primaries or of other impedance means used instead, need not be wholly shorted but reduced only enough by switches or other impedance reducing means to fire tube 310 in the manner explained below. It should be noted that while this exemplary disclosure shows three groups or decades of commutator segments, etc., those skilled in the art can provide decades to measure greater or smaller lengths, e.g., those which measure lengths along the bed in excess of 20 inches and/or in increments smaller than one-tenth of an inch. Another decade having its brushes moving ten times as fast as brush 270 would measure increments of one hundredth of an inch, and another decade with its brushes moving ten times as fast as that would measure increments of one thousandth of an inch. Similarly, the decade with which brushes 276 and 278 are in contact could be filled out by simple addition to the electrical circuit so that it could measure up to ninety inches along the bed.

The transformers 287 and 289 in the last or tens decade have their primaries connected at their lower ends to a line 290 which is connected to one corner 292 of a rectifier bridge 294, having four rectifiers 295. A resistor 320 is paralleled across bridge 294 and is connected to corners 292 and 296 of the bridge. Thus, the bridge responds to the voltage drop across resistor 320. The opposite corner 296 of the bridge is connected through a transformer secondary 298 back to line 280. The transformer secondary 298 is energized from any suitable source of alternating current supplied by a transformer primary, not shown. The other transformer secondaries shown in FIGURES 4A and 4B, except those in converter 130, are supplied in similar manner, their primaries not being shown. The transformer secondary 298 and lines 280 and 290 plus resistor 320 thus provide the voltage across the converter 130. However, little current flows through the converter because the resistances and inductances of the transformer primaries in the converter 130 are relatively high. As the brushes 270, 272, 274, 276, and 278 move over the commutator segments, they ultimately reach a point where one of the shorting switches (like switch 291) in each decade is closed so that a complete short circuit path through the brushes, segments, and switches exist between line 280 and line 290. This causes the full voltage of transformer secondary 298 to be impressed across resistor 320 and therefore bridge 294 and thus drives line 300 more positive with respect to line 302. A second rectifier bridge 304, composed of four rectifiers 305, is connected to be energized by a transformer secondary 306 to supply direct current to potentiometer 308 connected across the bridge. Any other suitable source of direct current could be used to supply a voltage across potentiometer 308.

With further reference to FIGURE 4A, gas filled tube 310 has its grid 312 connected to the adjustable tap 314 of the potentiometer 308 and has its cathode 316 connected to line 302. A resistor 301 is connected between lines 300 and 302 to prevent the grid 312 from floating. As long as reduced impedance such as a short circuit does not exist between lines 280 and 290, the voltages from bridges 294 and 304 drive grid 312 negative with respect to its cathode 316 so that firing of tube 310 does not occur. When the lines 280 and 290 have the impedance between them reduced or are short circuited through the converter 130, the then greater positive voltage from bridge 294 on line 300 counteracts, in effect and at least partially, the negative voltage across potentiometer 308 by raising the potential at junction 307, and driving grid 312 to the tube firing potential with respect to its cathode, with the result that tube 310 fires and provides an output signal. Current is then conducted between cathode 316 and plate 318. It is apparent, then, that tube 310 acts as a relay and that any other type of sensitive relay could be used. As mentioned before, the impedances of the primaries of the transformers in the converter 130 are relatively high. This is true because all the impedances across the transformer secondary 298 are so chosen in relation to resistor 320 that if two decades only have their impedances reduced as by short circuiting, tube 310 will not fire. That is, the voltage across resistor 320 increases only a sufficient amount to cause firing of tube 310 when all the decades in the converter have reduced impedance, and lines 280, 290 connect only such reduced impedance and resistor 320 across transformer secondary 298.

Continuing to refer to FIGURE 4A, but now at the right center side thereof, it is seen that transformer secondary 322 is center tapped to line 303, which connects with line 302, and has its opposite ends connected to a full wave rectifier tube 324 to provide a direct current potential between lines 302 and 326 with positive voltage to plate 318 of tube 312. Any other suitable source of direct current potential may be used. Connected to line 326 is a traverse right limit relay 328 with contact TRL1, and between this relay and line 303 are serially connected normally closed contact TRR3 and normally open contact TRR4 which are two of five contacts actuated by the traverse right relay TRR of FIGURE 4B. Between TRR3 and TRR4 line 330 serially connects resistor 332 and capacitor 334 to line 326. Serially connected between plate 318 and line 326 are a main control relay MCR, operative upon receipt of an output signal from relay 310 and which has a normally open contact MCR1 connected between lines 303 and 338, and normally closed contact SS1 operated by stepping selector solenoid SS. Line 338 is connected to selector solenoid SS which further connects through line 340 to line 326. Selector solenoid SS is a rotary type stepping selector switch and has two arms 342 and 350, each of which, in this example, sweeps over a different group of nine separate contacts step by step upon successive energizations of the solenoid by the output of tube 310 for selecting between said nine contacts. In addition, as mentioned above, solenoid SS operates switch contact SS1, and this it does at each stepping thereof so that the voltage on line 326 is removed from plate 318 to de-ionize tube 310 and stop the output signal therefrom.

The first arm 342 driven by selector switch SS is connected to line 303 and passes over a group of nine contacts 344 of which all but one, 344a, are connected together by line 346 to reset relay R. The other side of reset relay R is connected to line 326. Connected between lines 346 and 338 is a line 348 containing a normally closed contact HIR5 operative by relay HIR (FIGURE 4B) and normally closed contact TRR5. Serially connected between lines 280 and 290 are normally open contact TRL1 actuated by the traverse right limit relay 328 and normally open contact R1 actuated by reset relay R. Also serially connected between lines 280 and 290 are normally closed contact R2 actuated by reset relay R and normally open contact SC1 operated by start cycle relay SC (see FIGURE 4B).

A second switch arm 350 is actuated by stepping switch SS in step with the other arm 342. Arm 350 connects line 326 to one of nine contacts 352. These contacts are individually connected, respectively, except for the first contact 352a, to the operation selector solenoids here designated OS–A through OS–H, one for each row of push buttons in register 148 and the latter of which is also illustrated in FIGURE 3 and numbered 256. The other sides of these solenoids are connected to line 303. Also connected between lines 326 and 303 are the position selector solenoids PS1 through PS4 for actuating rows 1 through 4 respectively of the upper register 146 in the same manner as described for row H by solenoid OS–H in FIGURE 3. In series with these solenoids, respectively, are switches 354, 355, 418, and 416 which as shown in FIGURE 3 are operated by the left four columns of push buttons, respectively, in the lower register 148. For example, normally open switch 354 in series with solenoid PS1 is actuated by a vane standing behind the column of buttons indicated as control position 1 in FIGURE 2. In similar manner the switches in series with position selector solenoids PS2 through PS4 are operated by vanes located behind the control position columns 2 through 4 respectively. Solenoids PS1 through PS4 are located behind the front of register 146 to actuate the corresponding bar behind each row to select which control position shall be active. The switches controlled by these solenoids are the switches connected in the converter 130 circuits, of which switch 291 (FIGURE 4A) is an example.

Figure 4B:
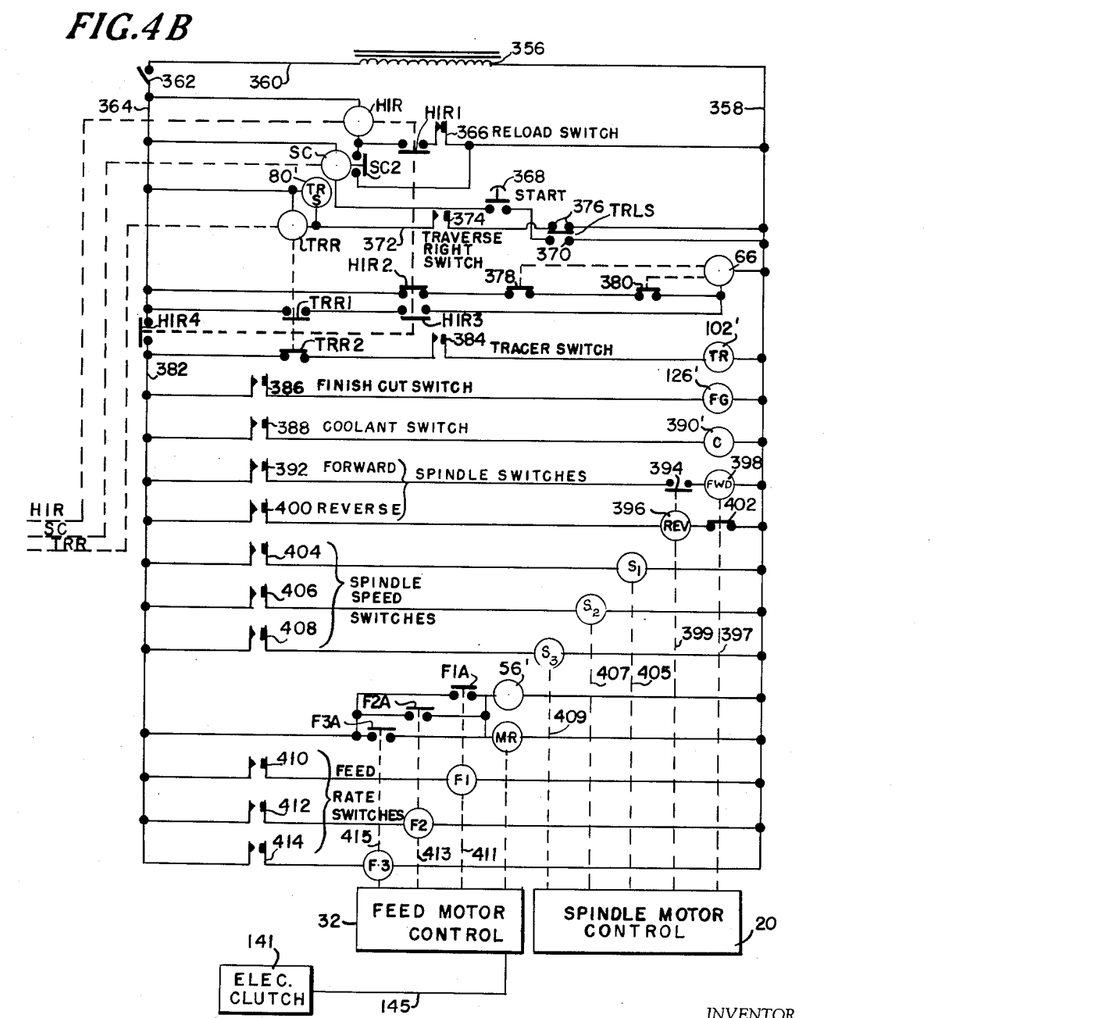

Referring now to FIGURE 4B, a transformer secondary 356 provides energization to lines 358 and 360. Switch 362 can be closed to cause energization of line 364 and activate the machine control circuits 144 shown in block form in FIGURE 1. Serially connected between lines 364 and 358 are a hold-in relay HIR, a normally open hold-in contact HIR1, and a normally closed reload contact 366 operating by any of the push buttons in the "reload" column of register 148 in FIGURE 2, for example button 244 (see also FIGURE 3). Across HIR1 and contact 366 is a normally open contact SC2 actuated by the start cycle relay SC. Serially connected between line 364 and line 358, besides start cycle relay SC, are start cycle push button 368 (not shown in FIGURE 2), and normally open terminals 370 associated with the traverse right limit switch TRLS. Connected in parallel between line 372 and line 364 are solenoid 80', for operating the traverse right hydraulic control valve 80 in FIGURE 1, and traverse right relay TRR which controls five contacts TRR1 through TRR5. Line 372 is connected to line 358 through a series combination of traverse right switch 374 operative by any of the push buttons in the reverse movement column Traverse R of lower register 148 of FIGURES 2 and 3, and terminals 376 closed by the traverse right limit switch TRLS. Switch TRLS is secured to the bed 10 in any suitable manner or otherwise arranged (see FIGURE 1) so that terminals 376 are open and terminals 370 are closed when carriage 24 is in its right limit position. Those familiar with the art will appreciate in view of the present disclosure that switch TRLS could be eliminated with its function being retained and accomplished by the converter 130, for example, by a sensing of all appropriate brushes on their 0 commutator segments. Also connected between line 364 and 358 is a series arrangement of normally closed contact HIR2 actuated by hold-in relay HIR, normally closed "homing" contact 378 (which is closed except when solenoid 66—note same in FIGURE 1— is reset by rotating to its "home" or starting position), interrupter switch 380 (which is opened by solenoid 66 upon each actuation thereof to permit continuous operation of the solenoid), and rotary solenoid 66. Also connected between line 364 and solenoid 66 is a series combination of normally open contact TRR1 operated by relay TRR, and normally open contact HIR3 operated by relay HIR. Relay HIR has a contact HIR4 located between lines 364 and line 382.

Serially connected between line 382 and line 358 are normally closed contact TRR2, switch 384 operative by any of the push buttons in the column designated Tracer in the lower register 148 of FIGURE 2 (note this switch also in FIGURE 3), and solenoid 102' for operating the tracer control hydraulic valve 102 in FIGURE 1. Similarly connected between lines 382 and 358 are the FIGURE 2 Fin. Cut column switch 386 (note same in FIGURE 3) and the finish cut solenoid 126' for operating the template position valve 126 (FIGURE 1), which in turn regulates the position of the template table 123. Also connected between lines 382 and 358 in series are Coolant column switch 388 and a coolant control solenoid 390' which when energized permits coolant to flow to the tool 96 from pump 389 (FIGURE 1) driven by motor 391 through valve 390.

Normally open switch 392 (note same in FIGURE 3) is operable by any of the push buttons in the Spindle F column of FIGURE 2 and is in series with normally closed contact 394 operated by spindle reverse solenoid 396, and the spindle forward solenoid 398. Further serially connected between lines 382 and 358 are switch 400 associated with the push buttons in the Spindle R column of FIGURE 2, spindle reverse solenoid 396, and normally closed contact 402 operated by the spindle forward solenoid 398. Beside controlling contacts 402 and 394, respectively, forward solenoid 398 and reverse solenoid 396 control other contacts in the spindle motor control system 20 as is indicated by dotted lines 397 and 399, respectively, in a manner as previously noted. Serially connected between lines 382 and 358 are normally open switch 404 and relay S1 which, when the switch is closed by any of the buttons in the Spindle Speed 1 column of FIGURE 2, selects a particular potentiometer in the spindle speed control system 20, as indicated by dotted line 405, to cause the spindle to rotate at a speed dictated by the presetting of the first spindle speed potentiometer. In similar manner solenoids S2 and S3 are respectively serially connected with spindle speed switches 406 and 408 between lines 358 and 382 for preset, potentiometer control of the spindle speed, according to the push button depressed. Dotted lines 407 and 409 respectively indicate the mechanical connection of solenoids S2 and S3 to control system 20.

Further connected between lines 382 and 358 in series are contact F1A operated by feed relay F1 and solenoid 56' which, when energized, opens stop valve 56 (see FIGURE 1) and causes cylinder 50 to move cross slide 44 back against the then active stop 62. Connected in parallel to contact F1A between line 382 and solenoid 56' are normally open contacts F2A and F3A respectively operated by feed rate relays F2 and F3. Connected in parallel to solenoid 56' is feed motor relay MR which, when energized starts feed motor 30 by means of contacts (not shown) in feed motor control 32. Feed relays F1, F2, and F3 are operated by serial connection respectively with switches 410, 412, and 414 between lines 358 and 382. Switches 410, 412, and 414 are shown also in FIGURE 3 and are associated with the push buttons in volumns 1, 2, 3 respectively, under Feed Rate in register 148, FIGURE 2. Preferably, the feed selector solenoids F1, F2, and F3 select preset potentiometers in accordance with the principles set forth in Patent 2,609,524 or in the Patent No. 2,864,047, as above mentioned, within the feed motor control system 32, as indicated by dotted lines 411, 413, and 415, to allow the carriage to feed at the preset rate and cause the feed motor to run by means of energization controlled by solenoid MR, which also closes contacts (not shown) to provide energy on line 145 to the electric clutch 141 for movement of the carriage.

*Operation*

Assuming all of the elements of the control system and the machine are in their starting positions with the darkened register push buttons having been depressed, the operation of the machine proceeds as follows. Energization is coupled to the secondaries of transformers 298, 306, 322 (FIGURE 4A) and 356 (FIGURE 4B) by means not shown. Thereupon switch 362 is closed to supply energization to lines 358 and 364. The carriage is at this time resting at its extreme right movement with the traverse right limit switch TRLS therefor closing contacts 370. Starting push button 368 is momentarily depressed to start the machine cycle. Thereupon starting cycle solenoid SC is energized to close contact SC2 for energization of relay HIR which holds itself in through contact HIR1. Contact SC1 (FIGURE 4A) is also closed by solenoid SC to short circuit lines 280 and 290 through normally closed contact R2, thus creating a negative, but relatively positive voltage on potentiometer arm 314 to cause tube 310 to fire. This energizes relay MCR which closes contacts MCR1 and allows stepping switch SS to be energized by voltage between lines 303 and 326 so that its driven arms 342 and 350 move clockwise from their illustrated position one step. Also solenoid SS causes momentary opening of contact SS1 at this time which opening de-ionizes tube 310 and deenergizes solenoid MCR.

When arm 342 moves clockwise from its illustrated position to the first connected contact 344 upon stepping of SS, line 346 is energized from lines 303 and 326, and relay R thus opens contact R2 and closes contact R1. Normally closed contact HIR5 in line 348 is open due to the prior energization of solenoid HIR so that further energization of stepping switch SS is prevented. The arm 350 has moved clockwise to the first of its connected contacts 352, i.e., to the one associated with operation selector solenoid OS–A which is the solenoid behind the push buttons in row A of lower register 148 in FIGURE 2. All of the depressed buttons in row A will cause actuation of their corresponding switches. Thus, due to the closing of contact HIR4 (FIGURE 4B), the depression of push button 176 (FIGURE 2), the actuation of solenoid OS–A, and the consequent closing of switch 410, feed rate 1 relay F1 is energized. Closing of contact F1A thereby energizes stop valve solenoid 56' for cross-feed control and relay MR to start feed motor 30. Relay S1 is energized by the closing of switch 404 when push button 178 is depressed, while spindle forward relay 398 is energized by the depression of push button 180 and the consequent closing of switch 392. Likewise, tracer control solenoid 102' is energized by push button 182 and the closing of switch 384, while push button 184 and switch 388 cause the coolant solenoid 390' to be energized. Switch 416 is closed by the depression of the row A control position 4 push button 174. The closing of switch 416 energizes position selector solenoid PS4 to which is connected a switch operating bar (like bar 254 of FIGURE 3) for row 4 in the upper register 146. The depression of the desired buttons in row 4 and energization of PS4 closes the corresponding shorting switch contacts (like switch 291 in FIGURE 4A) in the converter 130.

Thus, as the carriage moves to the left the converter is ready to short circuit lines 280 and 290 when the desired terminal position indicated by row 4 is reached. It should be noted that the original energizing of solenoid HIR (FIGURE 4B) closed contact HIR3 to ready rotary solenoid 66 for indexing from its first position to the second cut position. In the first position of solenoid 66, the cross slide 44 is, in this example, held considerably toward the operator by the first stop 62, and the angular slide 84 moves forwardly until piston 88 is bottomed in cylinder 86, and thus a straight rough cut is taken along line 149 of FIGURE 5 since tracer 118 cannot then contact either template 120 or 122.

When coincidence between the terminal distance preset by the control members or push buttons in row 4 of register 146 and the actual distance moved by the carriage occurs, a short circuit between lines 280 and 290 exists and the grid 312 becomes relatively positive thereby energizing relay MCR and closing contact MCR1 with the consequent stepping of the selector stepping switch SS to its next position for the energization of solenoid OS–B. Then the preset situation of row B of register 148 becomes active. However, in this row only button 186 in the traverse right column is depressed. Thus, switch 384 corresponding to the undepressed push button 187 is open so that the tracer solenoid 102' is deenergized and the tracer 118 backs out. Because push button 186 is depressed, switch 374 is now closed, and for hydraulic control of the carriage's rightward movement, the limit switch TRLS continues to close terminals 376 to energize the traverse right solenoid 80' and the traverse right relay TRR. Lack of a depressed feed rate button in row B deenergizes stop solenoid 56' and causes cross slide 44 to move toward the operator. Energization of the traverse right relay TRR opens contacts TRR2 (FIGURE 4B), TRR3 (FIGURE 4A), and TRR5, and closes contacts TRR4 (FIGURE 4A) and TRR1 (FIGURE 4B). Closing of contact TRR1 indexes solenoid 66 to its next position. In FIGURE 4A, condenser 334 is charged through resistance 332 from the potential between lines 326 and 303 through the newly closed contact TRR4 during the time carriage 24 is traversing right. Upon opening of terminals 376 by the traverse right limit switch TRLS when the carriage's extreme rightward position is obtained, solenoids 80' and TRR are deenergized. Dropping out of solenoid TRR opens contact TRR4 (FIGURE 4A) and closes contact TRR3 whereby condenser 334 discharges through the traverse right limit relay 328 to close contact TRL1 until the charge on condenser 334 is substantially dissipated which is only long enough for closed contact TRL1 to short circuit converter 130 between lines 289 and 290 and cause firing of tube 310. Relay MCR then closes and causes the stepping of switch SS to the next of its contacts 352.

In this condition solenoid OS–C is energized to cause closure of the switches corresponding to the depressed push buttons in row C in the lower register 148. Since button 188 is depressed, switch 418 (FIGURE 4A) closes to cause energization of solenoid PS3 and activation of row 3 in the upper register 146 with consequent closure of the corresponding terminal distance shorting switches in converter 130.

By these means the machine is able to make a plurality of cuts across the workpiece and during any cut different conditions may be invoked without reversal of the carriage. For example, in accordance with the depressed push buttons in rows E, F and G and while the finish cut is being made along lines 153, 155, and 157 of FIGURE 5 (because the depressed buttons 214, 224, and 238 cause energization of solenoids 126' and consequent actuation of template position valve 126 so that the template table 123 is moved to put the finish template 120 in position to be traced by tracer 118) not only are the terminal distances changed (increased) by buttons 202, 215, and 228, respectively, but the feed rate for cutting of the taper along line 155 is changed to a slower rate by depression in row F of button 216 and then back to a faster rate in row G according to depressed button 230.

In row H, which in the illustrated example is the last operation of the machine in the programmed cycle, the traverse right button 242, coolant button 266, and the reload button 244 are depressed. Thus, when the operation selector solenoid OS–H is energized by the stepping switch arm 350, carriage 24 traverses right by means described above, and in addition normally closed contact 366 (FIGURES 3 and 4B) in series with the hold-in contact HIR1 of the hold-in relay HIR is opened. This deenergizes relay HIR which closes contacts HIR2 and HIR5. Closing of contact HIR2 causes a completed circuit from line 364 through HIR2, homing switch 378, interrupter switch 380 to the rotary solenoid 66 which continually steps until switch 378 is opened when the rotary solenoid reaches its home or starting position. When the carriage traverses to its right limit and opens terminals 376 to deenergize the traverse right solenoid 80' and traverse right relay TRR the closing of contact TRR5 (in FIGURE 4A) causes energization of the stepping switch SS from lines 303 and 326 through line 346, contacts HIR5 and TRR5, and line 348 until the arm 342 reaches the home position contact 344a. (In actual construction contacts 344 may be arranged around a semicircle and two diametrically opposed contact arms may be provided, so that a single step of solenoid SS from its last active position will place it in the reset or starting position.)

It is thus seen that the machine and all its component parts are back again to their starting position. Therefore, a second workpiece can be placed in the machine and cut in the same manner as above described to produce a duplicate of the first workpiece, etc. Alternatively, any or all of the clearing push buttons 175 and 246 may be depressed to allow presetting of a different program of operation of the machine.

Thus, it is apparent that there is provided by this invention a structure in which the various phases, objects, and advantages hereinbefore set forth, inter alia, are successfully achieved.

Modifications of the invention not described herein will become apparent to those skilled in the art. For example, without limitation, it is obvious that more or less columns and rows of push buttons may be provided as desired with a corresponding number of commutator segments.

Therefore, it is intended that the matter contained in the foregoing description and the accompanying drawings be interpreted as illustrative and not limitative, the scope of the invention being defined in the appended claims.

I claim:

1. Apparatus for automation of a machine having a movable element, comprising register means for presetting a distance to be moved by said element, means for moving said element, and means for sensing that said element has moved to the distance preset on said register means, said sensing means comprising at least one commutator segment representing at least in part the preset distance, impedance means connected to said one commutator segment for causing impedance to current therein, brush means coupled for movement with said element for engaging at least said one commutator segment, and means for reducing the impedance of said impedance means when said distance is preset.

2. Apparatus as in claim 1 wherein said impedance reducing means comprises an electrical switch connected to said register means.

3. Apparatus as in claim 1 and further comprising means coupled to said sensing means and responsive to the reduced impedance thereof for providing an output signal indicative of said movable element having moved said predetermined distance.

4. Apparatus as in claim 3 and further comprising actuating means for causing operation of the impedance reducing means, energizing means for said actuating means, and switch means for connecting the energizing means to said actuating means upon occurrence of said output signal.

5. Apparatus as in claim 1 wherein said register means comprises means for presetting at least a second distance to be moved by said machine element, the apparatus further comprising means for causing movement of the machine element in accordance with said second preset distance when the sensing means senses that said element has moved to said first mentioned distance.

6. Apparatus as in claim 5 wherein said last mentioned movement means comprises a sequence register.

7. Apparatus as in claim 1 wherein said machine has a second movable element and means to cause movement thereof, said apparatus further comprising means to regulate positively a limiting distance of movement of said second element during movement of said first mentioned element to a preset distance.

8. Apparatus as in claim 7 wherein said regulating means comprises a plurality of stops and stepping means for operatively engaging different ones of said stops with said second movable element successively.

9. Apparatus for automation of a machine having a movable element, comprising register means for presetting a distance to be moved by said element, means for moving said element, and means for sensing that said element has moved to the distance preset on said register means, said register means comprising means for presetting at least a second distance to be moved by said machine element in said first direction, the apparatus further including means coupled to the element movement means and to said register means for regulating the movement of the machine element in accordance with said second preset distance when the sensing means senses that said element has moved to said first mentioned preset distance.

10. Apparatus as in claim 9 wherein the movement regulating means comprises means for continuing movement of the element to said second preset distance upon sensing of movement to the first mentioned preset distance and wherein the sensing means and said means coupled thereto effect actuation of the reverse movement means only thereafter.

11. Apparatus as in claim 9 wherein the movement regulating means comprises means for moving the machine element said second preset distance only after the reverse movement means has been actuated and the element has moved in a reverse direction to a predetermined position.

12. Apparatus for automation of a machine having a movable element, comprising register means for presetting a distance to be moved by said element, means for moving said element, and means for sensing that said element has moved to a distance preset on said register means, said machine having switch means operable by movement of said element to a predetermined position, said register means comprising means for presetting at least a second distance to be moved by said machine element, the movement of the element to said preset distances being along the same path from a predetermined position of said element, said means for moving said element comprising means for returning the element from any preset distance to said predetermined position, the apparatus further comprising a sequence register having a plurality of selection means for presetting the sequence of use of said preset distances, said selection means being operatively connected with the sensing means and with the means, respectively, for presetting the respective distances, and means coupled to said switch means for starting movement of said element from said predetermined position to the corresponding preset distance as a result of a preset one of said selection means, whereby movement of the element a distance corresponding to one of said preset distances and sensing thereof causes actuation of the element returning means whereupon the element moves back to said predetermined position and operates said switch means to cause subsequent movement of the machine element in accordance with another of said preset selection means and its associated preset distance.

13. Apparatus for automation of a machine having a movable element and means to move said element, comprising distance register means for presetting a distance to be moved by said movable element, sequence register means for presetting the sequence of movements of at least said movable element, each of said register means comprising a plurality of rows and columns of control members movable between first and second positions, an electrical switch associated with each column of control members, and means associated with each row of control members for operating all the switches whose associated control member in the row is preset to its second position, said apparatus further having means for sensing that said machine element has moved to the distance preset on the distance register means, the switches associated with said distance register being connected to said sensing means which is operatively connected to actuate the switch operating means in the sequence register means, the switch operating means in the distance register means being connected to at least part of the switches of the sequence register means, whereby movement of the machine element to the distance preset in the distance register means causes actuation of a different operating switch means in the sequence register means.

14. Apparatus as in claim 13 wherein the sensing means comprises a plurality of commutator segments each of which correspond to a predetermined unit of length and one of which represents at least in part the preset distance, a like plurality of impedance means connected respectively to said commutator segments, brush means coupled for movement with said element for substantially selective engagement with said commutator segments, and means connecting said electrical switches in the distance register to said impedance means respectively for reducing the impedance of said impedance means when said distance is preset by movement of the corresponding control members to their second position.

15. Apparatus as in claim 14 and further comprising relay means for producing an output signal, energy supply means connected to said sensing means for providing current therethrough, and means for coupling said relay means to the energy supply means for supplying at least a part of the voltage thereto, whereby upon movement of said element to said preset distance, the reduced impedance in said sensing means causes a decrease of voltage across the sensing means and an increase of voltage to said relay to produce said output signal.

16. Apparatus as in claim 15 and further comprising energizing means for providing energy to the switch operating means of said sequence register means, and means including stepping switch means having a plurality of contacts each connected to a different sequence register switch operating means for connection thereof to said energizing means one at a time, and means to step said switch means from one contact to another in response to said output signal.

17. Apparatus as in claim 13 wherein said machine has a second movable element and means to cause movement thereof in two opposite directions, said apparatus further comprising means for preventing movement of said second element in one of said directions beyond a predetermined point.

18. Apparatus as in claim 17 wherein the last mentioned means comprises a plurality of stops and stepping means for operatively engaging a different one of said stops with said second movable element upon actuation of at least some of the different operating switch means in the sequence register means.

19. Apparatus as in claim 13 wherein each of a predetermined plurality of rows in the distance register means has selected ones of its control members in their second positions for presetting a like predetermined plurality of different distances including said first mentioned distance, and wherein a like predetermined plurality of columns in the sequence register means is reserved for selecting the sequence of use of the distances preset in the distance register means, said electrical switches associated with the reserved columns being operatively connected respectively to the switch operating means for said predetermined rows, said apparatus further comprising means for actuating the switch operating means for the different rows in the sequence register means in a predetermined order whereby the sequence of actuation of the switch operating means for the different rows of said predetermined plurality thereof and the consequent association of the corresponding preset distances with the preset distance sensing means is determined by the order in which the control members in said reserved columns are preset to their second positions.

20. Apparatus as in claim 19 wherein the element movement means moves the element any of the preset distances in a first direction and comprises means for moving said element in a direction reverse to said first direction, the further improvement comprising another of the columns in said sequence register means being reserved for dictating reverse movement of the element, and the electrical switch associated with the reserved reverse column being operatively connected to the reverse movement means so that reverse movement occurs when the switch operating means for a row containing a reverse column control member in its second position is actuated.

21. Apparatus as in claim 20 wherein the machine has means for supplying electrical energy to solenoid means for controlling the first direction movement means, the further improvement comprising yet another of the columns in said sequence register means being reserved for controlling the energy supply means, the switch associated with the latter reserved column being effectively connected between the energy supplying means and said solenoid means whereby in an actuated row of control members in the sequence register means, the energy controlling column control member allows energy to the solenoid means if in its first position but not if in its second position.

22. Apparatus as in claim 20 wherein said machine has a second movable element and means to cause movement thereof in two opposite directions, the further improvement in said apparatus comprising means for preventing movement of said second element in one of said directions beyond a predetermined point comprising a plurality of stops and means operative upon operation of the reverse movement means for stepping a different one of said stops into a position for operative engagement with said second element to limit movement thereof.

23. Apparatus as in claim 13 wherein said machine has a second movable element and means comprising motor means operable to control the movement of said second movable element in a given manner, and comprising the further improvement comprising means for operatively connecting one of the switches in said sequence register to the means including motor means to cause control thereby of said second element.

24. Apparatus as in claim 13 wherein said machine has a second movable element, means to cause movement thereof relative to said first mentioned movable element, a device, a plurality of given means each differing from the other, means for causing relative motion between said device and at least a predetermined one of said given means at a time, whereby said device moves in a given manner, means for selecting said one given means, and including the further improvement comprising one column of said control members of the sequence register means being reserved for each of said given means, the electrical switches associated with the so reserved columns being operatively connected with the movement means for said second movable element and with said selecting means whereby said device when moving in said given manner during movement of said first machine element controls movement of said second movable element through its movement means if at least one of said reserved control member columns has one of its control members in its second position.

25. Apparatus as in claim 24 wherein an electrical switch associated with one of the reserved control member columns is operatively connected with the second element movement means and another of said electrical switches associated with a different reserved control member column is operatively connected to said selecting means whereby said device moves in one given manner, when in contact with one of said given means during movement of the first mentioned movable element if a control member in said one column is preset to its second position, while said device moves in another given manner while in contact with another of said given means during movement of the first mentioned element only if a control member in each of said one and different columns is preset to its second position.

26. In apparatus for automation of a machine having a first movable element and means for moving same, a second element movable transversely to said first element and means for moving said second element, a third element movable at an angle to each of said first and second elements and means for moving said third element, the improvement comprising a carriage position register for presetting the respective distances to be moved by said first element, a cycle sequence register including circuit selector means for actuating sequential predetermined movements of said first element, and coincidence circuit means for determining coincidence of the distance preset on said position register and the distance actually moved by said first element, the detection of coincidence causing said sequence register to initiate a succeeding predetermined movement of the first element and controlling the movement means for each of said elements.

27. In apparatus for automation of a machine, at least one commutator segment having impedance means connected thereto and means comprising selectively operable means for reducing the impedance of said impedance means when operated, brush means for engaging at least said one commutator segment, input and output current carrying lines, said brush means being coupled to one of said lines and said impedance means being coupled to the other line whereby electrical current passing between said lines meets less impedance when the brush means engages said one segment if the impedance reducing means is operated than if the impedance reducing means is not operated.

28. In apparatus for automation of a machine having a movable element, converter means for detecting when said movable element has moved a predetermined distance from a predetermined position comprising an input and an output for providing electrical current to said means, brush means coupled to said input, a plurality of commutator segments adapted to be selectively contacted by said brush means, each of said commutator segments corresponding to a predetermined unit of length, means to move said brush means over the commutator segments at a rate proportional in distance to the movement of said machine element, impedance means connected to each commutator segment respectively for carrying current between said brush means and said output, and means to reduce the impedance of each impedance means separately, said impedance being reduced when one of said commutator segments corresponds to at least part of said predetermined distance, whereby the impedance between said input and output is thereby lowered when said movable element has moved said predetermined distance.

29. Apparatus as in claim 28 and further comprising a lamp coupled across at least a portion of one of said impedance means to indicate when said brush means is in contact with said one impedance means but only if the impedance of said one impedance means is not then reduced by its respective impedance reducing means.

30. Apparatus as in claim 28 wherein said impedance means comprises an inductive winding.

31. Apparatus as in claim 28 wherein said impedance means comprises a transformer and a lamp coupled thereto.

32. Apparatus as in claim 28 wherein the impedance reducing means comprises a switch across at least a portion of the impedance of said impedance means.

33. Apparatus as in claim 28 and further comprising at least a second plurality of commutator segments each having second impedance means connected therewith and second means to reduce the impedance of each second impedance means separately, each of said second plurality of commutator segments corresponding to the total lengths represented by the first mentioned plurality of commutator segments, second brush means for selectively engaging said second plurality of commutator segments, means to move said second brush means from one of the second commutator segments to another while said first mentioned brush means moves over all of said first mentioned plurality of segments, said second brush means being connected to the first mentioned impedance means and the second mentioned impedance means being operatively connected to said output, whereby movement of said movable element to said predetermined distance represented at least in part by the combination of one commutator segment from each of said plurality thereof is detected by lowered impedance between said input and output when the impedance reduction means associated with the commutator segments representing at least in part said predetermined distance is operated.

34. Apparatus as in claim 33 wherein said second brush means comprises two brushes with the connections therefrom being, respectively, to a different group of said first mentioned impedance means.

35. Apparatus as in claim 28 and further including means coupled to said converted means and responsive to the lowered impedance thereof for providing an output signal indicative of said movable element having moved said predetermined distance.

36. Apparatus as in claim 35 wherein said further included means comprises an electric relay, current from which is said output signal, energy supply means connected to the input and output of said converter means for supplying current therethrough and means for coupling said electric relay to the energy supply means for supplying at least a part of the voltage thereto, said impedance lowering means decreasing the voltage across said converter means and increasing the voltage to said relay increases whereby said current therefrom is produced.

37. Apparatus as in claim 36 wherein said relay is a valve having a grid, cathode and plate, and the energy supply means comprises a source of direct current and an impedance shunted thereacross, while the coupling means comprises a voltage source connected at one end to said grid and at its other end to one junction of the direct current source and said impedance the other junction of which is connected to said cathode.

38. Apparatus as in claim 36 and further comprising a plurality of actuating means for causing operation of predetermined ones of the impedance reducing means, means to energize said actuating means, means comprising stepping switch means having a plurality of contacts each connected to a different actuating means for connecting said actuating means one at a time to the energizing means, and means to step said switch means from one contact to another in response to said output signal, said switch means further comprising means to stop said output signal when said switch means has stepped.

39. Apparatus as in claim 35 and further comprising actuating means for causing operation of at least a predetermined one of the impedance reducing means, energizing means for said actuating means, and means comprising switch means for connecting the energizing means to said actuating means upon occurrence of said output signal.

40. Apparatus as in claim 39 wherein said actuating means comprises a solenoid.

41. Apparatus as in claim 35 and further comprising a plurality of actuating means for causing operation of predetermined ones of the impedance reducing means, means to energize said actuating means, means comprising stepping switch means having a plurality of contacts each connected to a different actuating means for connecting said actuating means one at a time to the energizing means, and means to step said switch means from one contact to another in response to said output signal.

42. Apparatus as in claim 39 wherein the machine element is movable from a predetermined distance position to said predetermined position and operates a limit switch when at said predetermined position, the further improvement comprising means coupled to said limit switch for causing a second output signal from the means coupled to the converter means when the element reaches said predetermined position, and means to end said output signals.

43. Apparatus as in claim 42 wherein the means for causing a second output signal comprises a condenser, means operatively connected to said limit switch for charging the condenser during movement of said element to said predetermined position and for discharging the condenser when the element reaches said predetermined position, and means operatively connected to the converter means input and output and energized by the condenser discharge for at least momentarily reducing the impedance between said input and output, thereby causing a second output signal to operate said switching means.

References Cited in the file of this patent

UNITED STATES PATENTS

| | | |
|---|---|---|
| 2,168,326 | Collins | Aug. 8, 1939 |
| 2,473,507 | Bullard | June 21, 1949 |
| 2,476,789 | Wiberg et al. | July 19, 1949 |
| 2,508,162 | Herwald | May 16, 1950 |
| 2,537,427 | Seid et al. | Jan. 9, 1951 |
| 2,553,517 | Isserstedt | May 15, 1951 |
| 2,557,824 | Hornfeck | June 19, 1951 |
| 2,610,720 | Merles | Sept. 16, 1952 |
| 2,630,500 | Rommel | Mar. 3, 1953 |
| 2,707,501 | Craik | May 3, 1955 |
| 2,715,703 | Schuck | Aug. 16, 1955 |
| 2,720,129 | De Haas | Oct. 11, 1955 |
| 2,736,852 | Nelson | Feb. 28, 1956 |
| 2,741,732 | Cunningham | Apr. 10, 1956 |
| 2,769,124 | Erbe | Oct. 30, 1956 |
| 2,769,880 | Holmqvist et al. | Nov. 6, 1956 |
| 2,773,407 | Staples | Dec. 11, 1956 |
| 2,782,348 | Luhn | Feb. 19, 1957 |

FOREIGN PATENTS

| | | |
|---|---|---|
| 1,087,004 | France | Aug. 18, 1954 |